US010751898B2

(12) United States Patent
Justesen et al.

(10) Patent No.: US 10,751,898 B2
(45) Date of Patent: Aug. 25, 2020

(54) METHOD FOR WATER FLOW CONTROL FOR HYDRAULIC FOOD CUTTER

(71) Applicants: Neil Justesen, Burley, ID (US); Fred Leoni, Burley, ID (US)

(72) Inventors: Neil Justesen, Burley, ID (US); Fred Leoni, Burley, ID (US)

(73) Assignee: SOUTHERN FIELD WELDING, LLC, Burley, ID (US)

( * ) Notice: Subject to any disclaimer, the term of this patent is extended or adjusted under 35 U.S.C. 154(b) by 0 days.

(21) Appl. No.: 16/530,151

(22) Filed: Aug. 2, 2019

(65) Prior Publication Data

US 2019/0351572 A1 Nov. 21, 2019

Related U.S. Application Data

(60) Continuation of application No. 15/722,431, filed on Oct. 2, 2017, now abandoned, which is a division of application No. 14/847,269, filed on Sep. 8, 2015, now Pat. No. 9,776,335.

(51) Int. Cl.
*B65G 51/01* (2006.01)
*B26D 7/06* (2006.01)

(52) U.S. Cl.
CPC .................................. *B26D 7/0658* (2013.01)

(58) Field of Classification Search
CPC ........ B65G 51/01; B65G 53/44; B65G 53/58; B26D 7/0658; A63G 3/00; A23N 7/00
USPC ......... 406/82, 102, 106, 151, 152, 168, 194, 406/197; 137/10; 83/22, 24, 98, 99, 101, 83/402
See application file for complete search history.

(56) References Cited

U.S. PATENT DOCUMENTS

| | | | | | |
|---|---|---|---|---|---|
| 1,564,980 | A | | 12/1925 | Singer | |
| 3,109,468 | A | * | 11/1963 | Lamb | B26D 3/185 99/589 |
| 3,361,173 | A | * | 1/1968 | Lamb | B26D 3/185 83/23 |
| 3,694,037 | A | * | 9/1972 | Feder | B65G 53/06 406/23 |
| 3,809,438 | A | * | 5/1974 | Hubbard | B65G 53/60 406/106 |
| 4,082,024 | A | * | 4/1978 | Hodges | B26D 3/185 83/164 |

(Continued)

*Primary Examiner* — Joseph A Dillon, Jr.
(74) *Attorney, Agent, or Firm* — Burdick Patents, P.A.; Sean D. Burdick

(57) ABSTRACT

The present disclosure includes a method for the control of water flow within a hydraulic food cutter assembly having a pump, a pump discharge line, a cutter assembly a product supply tank, and a fluid transport medium and comprises a method for increasing the flow of fluid transport medium through the pump while maintaining a preselected velocity for the flow of the fluid transport medium in pump discharge line by using a frustoconical accelerator tube attached to the discharge line of the pump having a plurality of apertures through which the fluid transport medium may flow out of the accelerator tube into fluid tight housing encasing the accelerator and a throttling valve operatively attached to the fluid tight housing discharge line for regulating the pressure of the fluid medium being discharge from the pump so as to maximize fluid medium flow through the pump at a preselected pressure in the discharge line.

4 Claims, 3 Drawing Sheets

(56) References Cited

U.S. PATENT DOCUMENTS

| | | | | | |
|---|---|---|---|---|---|
| 4,135,002 | A * | 1/1979 | Hodges | B26D 3/185 | 426/482 |
| 4,154,484 | A * | 5/1979 | Holzenberger | B65G 53/30 | 406/106 |
| 4,320,995 | A * | 3/1982 | Tennes | B65G 53/30 | 406/106 |
| 4,807,503 | A * | 2/1989 | Mendenhall | B26D 3/185 | 83/112 |
| 4,911,045 | A * | 3/1990 | Mendenhall | B26D 1/0006 | 83/24 |
| 5,046,388 | A * | 9/1991 | Mendenhall | B26D 1/0006 | 83/24 |
| 5,168,784 | A * | 12/1992 | Foster | B26D 3/11 | 83/24 |
| 5,394,780 | A * | 3/1995 | Foster | B26D 3/11 | 83/402 |
| 5,421,226 | A * | 6/1995 | Mendenhall | B23D 35/008 | 83/22 |
| 5,568,755 | A * | 10/1996 | Mendenhall | B23D 35/008 | 406/195 |
| 5,806,397 | A * | 9/1998 | Mendenhall | B23D 35/008 | 406/195 |
| 6,413,566 | B2 * | 7/2002 | Caridis | A23N 12/02 | 426/518 |
| 6,447,215 | B1 * | 9/2002 | Wellmar | B65G 53/66 | 406/11 |
| 6,457,393 | B1 * | 10/2002 | Englar | B26D 7/0658 | 83/402 |
| 6,601,491 | B1 * | 8/2003 | Jensen | B26D 3/185 | 83/581.1 |
| 6,805,030 | B2 * | 10/2004 | Englar | B26D 7/0658 | 83/402 |
| 6,923,104 | B2 * | 8/2005 | Jensen | B26D 3/185 | 83/402 |
| 6,971,786 | B2 * | 12/2005 | Krambrock | B65G 53/30 | 366/165.1 |
| 7,052,213 | B2 * | 5/2006 | Mendenhall | B26D 7/0658 | 406/195 |
| 7,096,771 | B2 * | 8/2006 | Mendenhall | B26D 1/0006 | 83/402 |
| 7,117,778 | B2 * | 10/2006 | Fein | B26D 1/0006 | 83/857 |
| 7,674,077 | B2 * | 3/2010 | Opatril | B65G 51/01 | 406/106 |
| 8,746,270 | B2 * | 6/2014 | Patterson | G05D 7/0635 | 137/10 |
| 8,821,078 | B2 | 9/2014 | Hockett et al. | | |
| 9,086,164 | B2 * | 7/2015 | Mortzheim | F16K 24/00 | |
| 9,227,336 | B2 * | 1/2016 | Hebbeln | B26D 1/02 | |
| 9,359,151 | B2 | 6/2016 | Hockett et al. | | |
| 9,598,246 | B2 * | 3/2017 | Hockett | B65G 47/684 | |
| 9,821,485 | B2 * | 11/2017 | Mendenhall | B26D 1/12 | |
| 10,160,132 | B2 * | 12/2018 | Walker | B26D 3/11 | |
| 2001/0042428 | A1 * | 11/2001 | Jensen | B26D 3/185 | 83/402 |
| 2002/0122859 | A1 * | 9/2002 | Englar | B26D 7/0658 | 426/518 |
| 2002/0124739 | A1 * | 9/2002 | Englar | B26D 7/0658 | 99/537 |
| 2004/0040427 | A1 * | 3/2004 | Mendenhall | B26D 1/0006 | 83/98 |
| 2005/0006424 | A1 * | 1/2005 | Frankeberger | B65G 51/02 | 226/97.4 |
| 2009/0285642 | A1 * | 11/2009 | De Greef | B65G 51/01 | 406/12 |
| 2012/0174983 | A1 * | 7/2012 | Hockett | B65G 47/684 | 137/1 |
| 2015/0016898 | A1 | 1/2015 | Hockett et al. | | |
| 2015/0190940 | A1 * | 7/2015 | Hebbeln | B26D 1/02 | 83/402 |
| 2016/0113298 | A1 * | 4/2016 | Halse | A01K 79/00 | 406/106 |
| 2016/0214267 | A1 * | 7/2016 | Mendenhall | B26D 1/12 | |
| 2016/0340133 | A1 | 11/2016 | Hockett et al. | | |

* cited by examiner

METHOD FOR WATER FLOW CONTROL FOR HYDRAULIC FOOD CUTTER

CLAIM OF PRIORITY

This application is a continuation of U.S. application Ser. No. 15/722,431 filed on Oct. 2, 2017, which is a divisional of U.S. application Ser. No. 14/847,269 filed on Sep. 8, 2015. This application claims priority to both of the aforesaid applications, which are fully incorporated herein by reference.

FIELD OF INVENTION

This invention relates to a method to control the flow of water for use in a hydraulic food cutting machine to maximize discharge flow from a high capacity centrifugal pump while at the same time pumping uncut food products at a controlled velocity, into a hydraulic cutter assembly at a lower total flow rate.

BACKGROUND OF THE INVENTION

There is shown and described in FIG. 1 a prior art hydraulic food cutting assembly. At the heart of the hydraulic cutter is a centrifugal pump which discharges into a reducing pipe which brings the diameter of the discharge line down from a six to eight inch diameter at the pump discharge to around two inches in the discharge line. The purpose of the reducing pipe is to accelerate the food products which, for purposes of this Patent specification, shall be described in the context of uncut potatoes. The reduced diameter of the discharge line prevents the potatoes from tumbling in the line as they are directed toward the stationary cutter array or other cutter assembly. The cut food product exiting the cutter assembly and the water pass into an expansion line and ultimately into a discharge dump line. The water and the cut food product are dropped onto a conveyer chain of suitable width and length. The water drains through the conveyer chain back to a supply tank, and the cut food product is transported to an additional conveyer assembly and on for further processing. The food product, which in this example are potatoes, are dumped into the water in a supply tank which serves as a supply of water and uncut product for the centrifugal pump and a mixture of water and uncut food products pass through the suction line into the pump.

It should be apparent that while the example of food product being described in this specification are potatoes, other types of foods are also cut using similar hydraulic cutting machines to the one described herein and this invention applies equally to hydraulic cutting machines used to cut a number of different food products.

The problem is that the centrifugal pump being used is size limited in terms of the impeller and its attendant flutes have to be big enough to accept and pass through, without plugging, uncut food product that is to be pumped into the discharge line of the pump. In the case of potatoes, that means the flutes on the impeller have to be at least spaced apart approximately three to four inches so as to accept and pass through uncut potatoes. The result is that very large capacity pumps have to be employed in hydraulic cutting machines. And, since there are not a lot of hydraulic cutting machines manufactured on an annual basis, there is not enough demand for these pumps for a reputable pump manufacturer to actually try to design, if it is even possible, a pump that would meet the requirements of having a large impellor intended for continuous use in a low flow, high pressure environment.

As a result, the high capacity centrifugal pumps employed in cutting machines are typically designed for use in high capacity low lift applications such as at sewage treatment plants, commercial irrigation systems, municipal water systems, and the like. They are not designed to be used in very low volume high pressure head situations; and this is the problem since the product being cut has to be transported to the cutting assembly in a discharge line which is small enough to prevent unnecessary tumbling so that the cut food pieces are of uniform size and quality.

It has long been known that it is not necessarily the pressure that determines the ability of a hydraulic cutting system to cut food product, but rather the velocity of the food product being delivered to the cutting assembly and its array of stationary knives. As a result, hydraulic cutting assemblies are normally designed to transport the uncut food product at velocities between 20 feet per second (FPS) to 60 FPS.

In order to achieve these velocities, in the case of uncut potatoes, the discharge of the hydraulic pump, which is typically in the six to eight inch in diameter range, must be reduced to two to three inches in diameter. A reducing tube, as it is commonly called in the art, is employed to make this size reduction. It serves the dual function of reducing the diameter and also helping to align and accelerate the potatoes as they pass into the smaller discharge line. This functions just like the front half of the venturi assembly in that pressure is reduced but the speed of the fluid being pushed through the narrower discharge line is increased.

However, the pumps that have to be employed are not designed for this application. As in most cases, that high pressure portion of the pump head curve, at which these pumps are forced to operate because of the reducing tube and the dimensional constraints for the discharge line, has not even been tested by the manufactures and the pump is operating in what is commonly known as that portion of the measured pump head curve for which the pump was never intended to be used. The result of this is that the pumps take a beating and the impellers must periodically be replaced because of the erosion which occurs in an environment where there is low flow and extreme high pressure. This results in shortened pump life, and they have to be periodically replaced.

Another major problem with these low flow conditions is that in many cases the food product being pumped is not properly ejected from the impellor flutes and may be carried around inside the pump for multiple revolutions of the impellor thereby bruising or otherwise damaging the food product. Higher flows would result in less damage as the food products being pumped would be cleanly and quickly ejected from the pump.

In the prior art, the small discharge line restricts the flow to the point where the system cannot adequately accept and handle the flows required by the pump, whose size is determined the by the size of the food product to be cut.

Accordingly, what is needed is a method of increasing the flow through the pump in spite of the fact that the discharge line diameter is dictated by the size of the food product to be cut.

SUMMARY OF THE INVENTION

The purpose of the Summary of the Invention is to enable the public, and especially the scientists, engineers, and practitioners in the art who are not familiar with patent or legal terms or phraseology, to determine quickly from a cursory inspection, the nature and essence of the technical disclosure of the application. The Summary of the Invention is neither intended to define the invention of the application, which is measured by the claims, nor is it intended to be limiting as to the scope of the invention in any way.

The flow control assembly is attached to the discharge end of the centrifugal pump used to pump whole uncut food products suspended in a fluid medium, typically plain water into a cutter assembly. The centrifugal pump is sized based upon the expected size of the uncut food product to be processed which, for our example is potatoes. The flow control assembly is attached in lieu of the standard reducing pipe to the discharge end of the centrifugal pump.

The flow control assembly is comprised of a frustoconical slotted accelerator tube, which has a plurality of apertures, which in the preferred embodiment are slots to allow excess water or other fluid medium to flow out of the slotted accelerator tube into a fluid tight pressurized housing. While in the preferred embodiment the apertures are slots, other shapes of apertures could be used. The only criteria would be that the apertures be small enough to prevent food product from passing through, and that the sum total of aperture area has to be large enough to allow increased water flow through the pump sufficiently to bring the water flow through the pump to more closely match its normal designed pump head operating curve parameters.

Attached to, and interconnected with the housing, is a discharge line, which incorporates a pressure regulating throttling valve. The use of a pressure regulating throttling valve maintains regulated pressure in the housing and since it is a hydraulic system upstream of the pressure regulating throttling valve, it is effectively a closed hydraulic system at this stage; this means that the fluid pressure of the water entering the pump discharge line is the same as the pressure in the housing. This allows the operator to regulate the pressure in the pump discharge line and the entrained potatoes in the pump discharge line will travel at the given speed determined by the pump capacity, the frustoconical accelerator tube, and the diameter of the pump discharge line. In the preferred embodiment, at least in the case of potatoes, the speed is empirically determined and typically it is set to maintain food product speeds between 25 feet per second (FPS) and 40 FPS. The uncut potatoes impinge up the stationary array of cutting blades in the cutter assembly. The water passing through the cutter assembly and the now cut food pieces are decelerated in the decelerator line section and are passed out through a dump line onto a drainage conveyor. The water passes through the drainage conveyor and back to a supply tank and the cut food pieces are carried onto another conveyor for further processing. To complete the water loop, the centrifugal pump draws its suction through a suction line from the tank drawing a mixture of, in this example, water and uncut food product from the tank into the suction for the pump in order to be accelerated into the pump discharge line.

Water flow through the pump is increased by the addition of a housing discharge line and a throttling valve. In the preferred embodiment, the throttling valve incorporates an adjustable pressure regulator mechanism of any suitable and well known design so as to maintain a steady pressure in the housing and, consequently, in the much smaller pump discharge line, which is transporting the food product to the cutter assembly. In this manner increased water flow through the pump is achieved, thus bringing the volume of water passing through the pump at a given pressure more into line with the pumps designed pumping volume at that pressure as set forth on the pump head curve for the pressure at which the throttling valve is set to regulate, despite the physical constraints of the oversized pump having to pump water and food product of a particular size into a discharge line that is much smaller and not able to accept enough fluid to maintain performance at the desired pump head curve volume for a given pressure. This reduces the wear and tear on the pumps and the subsequent requirements for replacement of impellors, and entire pumps, at periodic intervals.

Still other features and advantages of the claimed invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the description of the preferred embodiments are to be regarded as illustrative in nature, and not as restrictive in nature.

DESCRIPTION OF THE PREFERRED EMBODIMENTS

Figure 1:
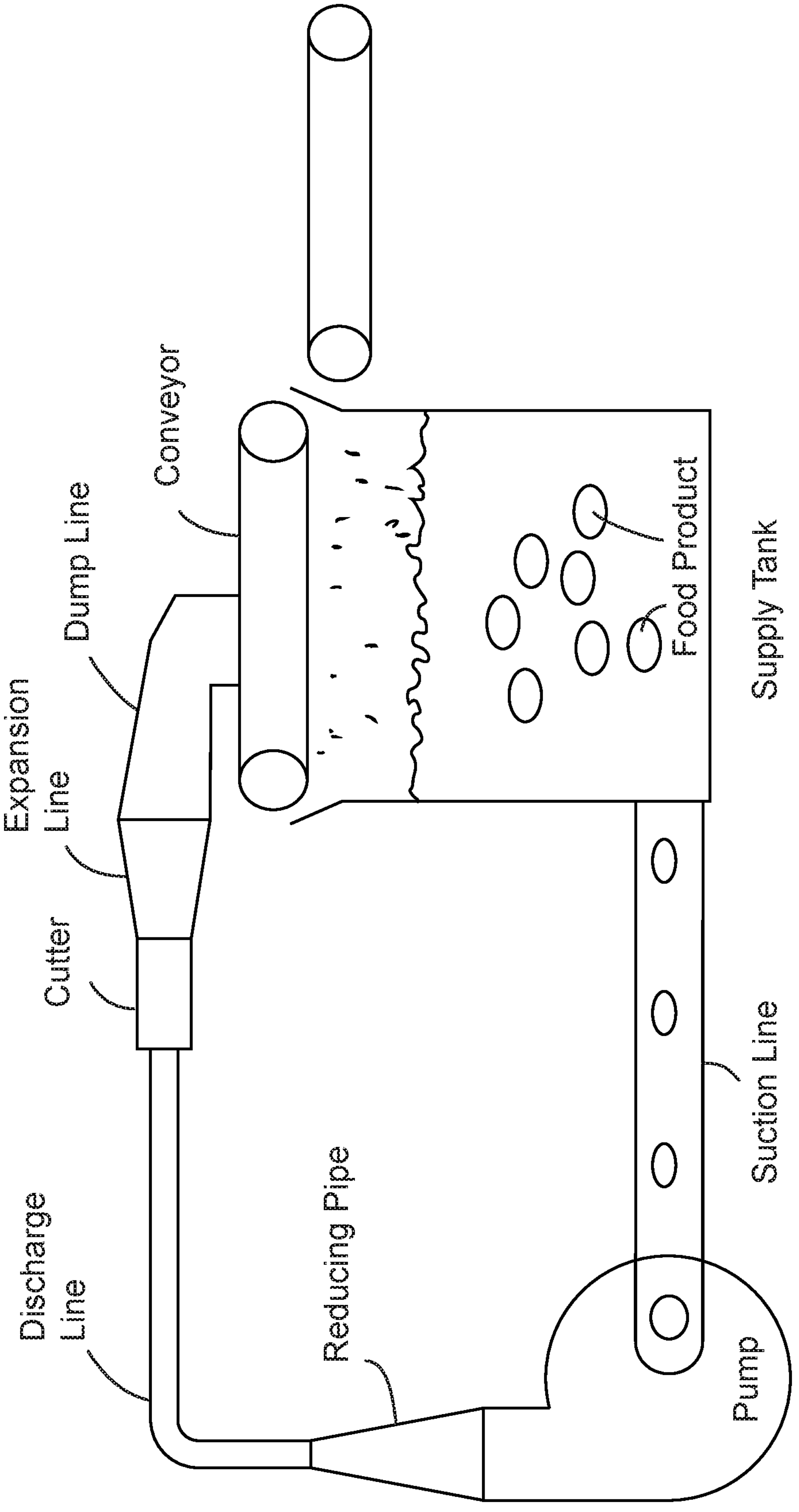
FIG. 1 PRIOR ART
FIG. 1 is a schematic representational view of a prior art hydraulic food cutting assembly.

While the presently disclosed inventive concept(s) is susceptible of various modifications and alternative constructions, certain illustrated embodiments thereof have been shown in the drawings and will be described below in detail. It should be understood, however, that there is no intention to limit the inventive concept(s) to the specific form disclosed, but, on the contrary, the presently disclosed and claimed inventive concept(s) is to cover all modifications, alternative constructions, and equivalents falling within the spirit and scope of the inventive concept(s) as defined in the claims.

Figure 2:
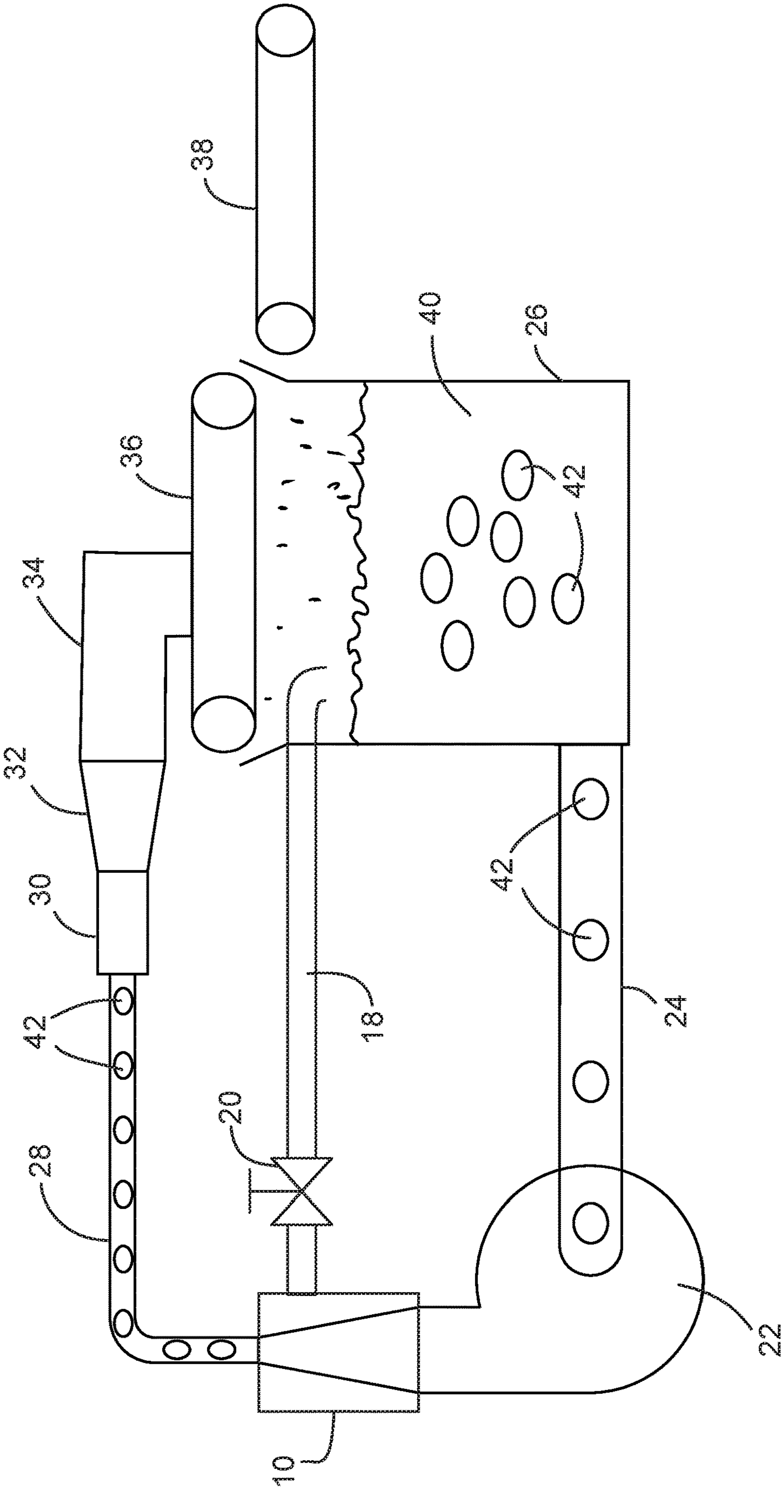
FIG. 2 is a schematic representational view of a hydraulic food cutting assembly which includes a water flow control assembly.
Figure 3:
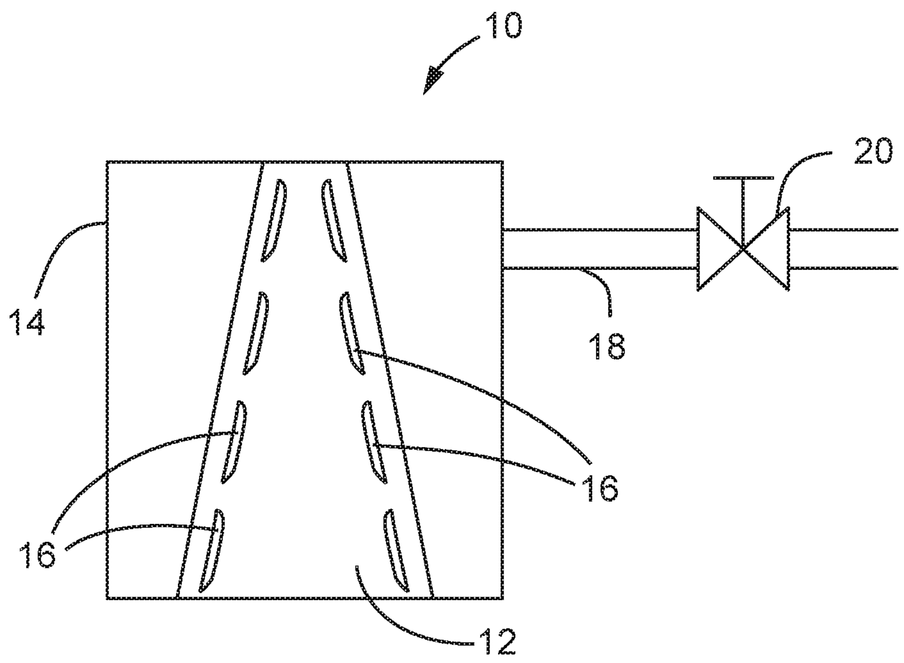
FIG. 3 is sectional view of a preferred embodiment of the water flow control assembly.

Referring now to FIGS. 2 and 3, there is shown and described a flow control assembly which diverts water from the discharge of the pump without any significant reduction of pressure or velocity of the water which contains the entrained uncut food products for delivery to the cutting assembly. Referring now to FIG. 2, there is centrifugal pump 22, which is sized based upon the expected size of the uncut food product to be processed which, in this example, are potatoes 42. Attached in lieu of the standard reducing pipe is flow control assembly 10. As shown in FIG. 3, flow control assembly 10 is comprised of a frustoconical slotted accelerator tube 12, which has a plurality of apertures, which in the preferred embodiment are slots 16 to allow excess water or other fluid medium to flow out of slotted accelerator tube 12 into a fluid tight pressurized housing 14. While in the preferred embodiment the apertures are slots 16, other shapes of apertures could be used. The only criteria would be that the apertures be small enough to prevent food product from passing through, and that the sum total of aperture area has to be large enough to allow increased water flow through the pump sufficiently to bring the water flow through the pump to more closely match its normal designed pump head operating curve parameters.

Attached to, and interconnected with, housing 14, is a discharge line 18, which incorporates pressure regulating throttling valve 20. The use of a pressure regulating throttling valve maintains regulated pressure in housing 14 and since it is a hydraulic system upstream of the pressure regulating throttling valve 20, it is effectively a closed hydraulic system at this stage; this means that the fluid pressure of the water entering the pump discharge line 28 is the same as the pressure in housing 14. This allows the operator to regulate the pressure in the pump discharge line 28 and the entrained potatoes in pump discharge line 28 will travel at the given speed determined by the pump capacity, frustoconical accelerator tube 12, and the diameter of the pump discharge line 28. In the preferred embodiment, at least in the case of potatoes, the speed is empirically determined and typically it is set to maintain food product speeds between 25 FPS and 40 FPS. The uncut potatoes impinge up the stationary array of cutting blades and cutter assembly 30. The water and the now cut food pieces are decelerated in decelerator line section 32 and are passed out through dump line 34 onto drainage conveyor 36. The water passes through the conveyor and back to a supply tank 26 and the cut food pieces are carried onto conveyor 38 for further processing. To complete the water loop, centrifugal pump 22 draws its suction through suction line 24 connected to tank 26 through which through which a mixture of the fluid transport medium 40, for our example, water and uncut food product 42, in this case potatoes, are drawn into the suction for the pump in order to be accelerated into the pump discharge line.

Water flow through the pump is increased by the addition of housing discharge line 18 and throttling valve 20. In the preferred embodiment, the throttling valve 20 incorporates an adjustable pressure regulator mechanism of any suitable and well known design so as to maintain a steady pressure in the housing and, consequently, in the much smaller pump discharge line which is transporting the food product to the cutter assembly 30. In this manner increased water flow through the pump is achieved, thus bringing the volume of water passing through the pump at a given pressure more into line with the pumps designed pumping volume at that pressure as set forth on the pump head curve, despite the physical constraints of the oversized pump having to pump water and food product of a particular size into a discharge line that is much smaller and not able to accept enough fluid to maintain performance at the desired pump head curve volume for a given pressure. This reduces the wear and tear on the pumps and the subsequent requirements for replacement of impellors, and entire pumps, at periodic intervals.

This configuration also reduces food product bruising by ensuring that there is sufficient fluid flow through the pump to allow consistent single pass ejection of the whole food product being cut through the pump and preventing whole food product from remaining in the flutes of the impellor for multiple rotations during pumping operations.

While certain preferred embodiments are shown in the figures and described in this disclosure, it is to be distinctly understood that the presently disclosed inventive concept(s) is not limited thereto but may be variously embodied to practice within the scope of the following claims. From the foregoing description, it will be apparent that various changes may be made without departing from the spirit and scope of the disclosure as defined by the following claims.

The invention claimed is:

1. In a hydraulic food cutter assembly having a pump, a product supply tank, a fluid transport medium contained within the product supply tank and including uncut food product, a suction line between the product supply tank and the pump, a hydraulic food cutter, a pump discharge line between the pump and the hydraulic food cutter, a method for reducing food product bruising comprising:

coupling between the pump and the pump discharge line a fluid tight housing, said fluid tight housing configured to allow a portion of fluid within the fluid transport medium to bypass the pump discharge line and return to the product supply tank via a housing discharge line; and regulating pressure of the fluid transport medium being discharged from the pump to cause flow of the fluid transport medium through the pump at a preselected velocity, thereby promoting single pass ejection of the uncut food product through the pump so as to prevent the uncut food product from remaining within the pump during multiple rotations of pump impellers;

wherein the coupling step further comprises enclosing a frustoconical accelerator tube within the fluid tight housing; and wherein the frustoconical accelerator tube includes a plurality of apertures configured to allow passage of the portion of fluid.

2. In a hydraulic food cutter assembly having a pump, a product supply tank, a fluid transport medium contained within the product supply tank and including uncut food product, a suction line between the product supply tank and the pump, a hydraulic food cutter, a pump discharge line between the pump and the hydraulic food cutter, and a reducing pipe that accelerates the uncut food product entrained in flow of the fluid transport medium from the pump discharge line to the hydraulic food cutter, a method for reducing food product bruising comprising:

coupling between the pump and the pump discharge line a fluid tight housing, said fluid tight housing configured to allow a portion of fluid within the fluid transport medium to bypass the pump discharge line and return to the product supply tank via a housing discharge line; and regulating pressure of the fluid transport medium being discharged from the pump to cause flow of the fluid transport medium through the pump at a preselected velocity, thereby promoting single pass ejection of the uncut food product through the pump so as to prevent the uncut food product from remaining within the pump during multiple rotations of pump impellers;

wherein the coupling step further comprises enclosing a frustoconical accelerator tube within the fluid tight housing; and wherein the frustoconical accelerator tube includes a plurality of apertures configured to prevent passage of the uncut food product.

3. The method of claim 1 wherein the regulating step further comprises regulating the pressure of the fluid transport medium by means of a throttling valve in the housing discharge line.

4. The method of claim 2 wherein the regulating step further comprises regulating the pressure of the fluid transport medium by means of a throttling valve in the housing discharge line.

* * * * *